US009071925B2

(12) United States Patent
Viswanathan et al.

(10) Patent No.: US 9,071,925 B2
(45) Date of Patent: Jun. 30, 2015

(54) SYSTEM AND METHOD FOR COMMUNICATING DATA BETWEEN AN APPLICATION SERVER AND AN M2M DEVICE

(75) Inventors: Harish Viswanathan, Morristown, NJ (US); Pramod Koppol, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 60 days.

(21) Appl. No.: 12/984,868

(22) Filed: Jan. 5, 2011

(65) Prior Publication Data

US 2012/0170451 A1 Jul. 5, 2012

(51) Int. Cl.
*H04W 4/00* (2009.01)
*H04W 4/02* (2009.01)

(52) U.S. Cl.
CPC .............. *H04W 4/005* (2013.01); *H04W 4/02* (2013.01); *H04W 4/003* (2013.01)

(58) Field of Classification Search
None
See application file for complete search history.

(56) References Cited

U.S. PATENT DOCUMENTS

| 2003/0040280 | A1* | 2/2003 | Koskelainen | 455/67.1 |
|---|---|---|---|---|
| 2004/0029591 | A1* | 2/2004 | Chapman et al. | 455/452.1 |
| 2004/0053629 | A1* | 3/2004 | Rueger et al. | 455/466 |
| 2005/0273489 | A1* | 12/2005 | Pecht et al. | 709/203 |
| 2007/0260673 | A1 | 11/2007 | Shenfield et al. | |
| 2008/0194272 | A1* | 8/2008 | Smith et al. | 455/456.3 |
| 2008/0244040 | A1* | 10/2008 | Bhatia et al. | 709/219 |
| 2009/0063697 | A1* | 3/2009 | Fukao | 709/232 |
| 2011/0081018 | A1* | 4/2011 | Cohen et al. | 380/255 |
| 2011/0217953 | A1* | 9/2011 | O'Reilly | 455/412.1 |
| 2011/0252143 | A1* | 10/2011 | Baumback et al. | 709/226 |
| 2012/0016942 | A1* | 1/2012 | Cherian et al. | 709/206 |
| 2012/0033613 | A1* | 2/2012 | Lin et al. | 370/328 |

FOREIGN PATENT DOCUMENTS

| CN | 101860807 A | 10/2010 |
|---|---|---|
| EP | 1853045 A1 | 11/2007 |
| JP | 2002204263 A | 7/2002 |
| JP | 2004274185 A | 9/2004 |
| JP | 2007-226783 A | 9/2007 |
| JP | 2007299390 A | 11/2007 |
| JP | 2009010957 A | 1/2009 |
| JP | 2009015379 A | 1/2009 |

(Continued)

OTHER PUBLICATIONS

International Search Report and Written Opinion dated May 8, 2012.

(Continued)

*Primary Examiner* — Otis L Thompson, Jr.
(74) *Attorney, Agent, or Firm* — Harness, Dickey & Pierce, P.L.C.

(57) ABSTRACT

Systems and methods for communication data between an application server and at least one machine-to-machine (M2M) device via an internet network and a network are provided. An example system includes a network element configured to schedule delivery of the data between the application server and at least one M2M device based on network information. The network element is located on a boundary between the network and the intern et network to which the application server communicates with the at least one M2M device.

20 Claims, 3 Drawing Sheets

(56) References Cited

FOREIGN PATENT DOCUMENTS

| | | |
|---|---|---|
| JP | 2009157650 A | 7/2009 |
| JP | 2010-016604 A | 1/2010 |

OTHER PUBLICATIONS

3GPP TS 22.368 V11.0.0, 3rd Generation Partnership Project; Technical Specification Group Services and System Aspects; Service Requirements for Machine-Type Communication (MTC); Stage 1 (Release 11), pp. 1-23, Dec. 2010.

Office Action for corresponding Japanese Application No. 2013-548451 dated Jul. 18, 2014 and English translation thereof.

Office Action for corresponding Korean Application No. 10-2013-7020434 dated Aug. 28, 2014 and English translation thereof.

Office Action for Chinese Application No. 201280004330.7 dated Apr. 1, 2015.

Decision to Grant a Patent for corresponding Japanese Application No. 2013-548451 dated Mar. 24, 2015.

3GPP TS 22.368 V11.0.0 (Dec. 2010), 3GPP, Dec. 2010, Huawei, HiSilicon, A Solution of MTC Group Pased Addressing [online], 3GPP TSG-SA WG2#81 S2-104631, URL:http://www.3gpp.org/ftp/tsg_sa/WG2_Arch/TSGS2_81_prague/Docs/S2-104631.zip, Oct. 15, 2010.

* cited by examiner

SYSTEM AND METHOD FOR COMMUNICATING DATA BETWEEN AN APPLICATION SERVER AND AN M2M DEVICE

BACKGROUND

Wireless networks are, increasingly used for communication to a large number of machine devices such as sensors and consumer electronics devices in addition to smart phones, personal digital assistants (PDAs), and computers resulting in an explosion of different applications. Many of these applications have a requirement to send content asynchronously from the network to the battery operated devices in a secure manner. Examples include pushing price information to smart meters in a demand response system, or sending push notifications to applications running on a smart phone to inform the client application on the device about new information available in the network.

Currently these applications communicate to their devices without any knowledge of network status or the status of the device in the network. Network status includes information about what parts of the network are congested at a given time, policies of the operator with regards to the preferred times and methods for message pushes and access control policies concerning who is allowed to access the device. Device status includes aspects such as device location, device registration to the network, and device wake up times. Furthermore, applications have to set up security keys and perform end-to-end encryption to achieve security.

The conventional approach to protecting the wireless network from an unexpected application behavior is simply to invoke overload prevention mechanisms in the network such as blocking through admission control when demands on the network exceed capacity. Application servers also typically provide their own capabilities to push and pull content from the device in an over-the-top fashion.

SUMMARY

Conventional overload mechanisms such as blocking are inefficient because of repeated attempts made by applications to communicate upon blocking. Communication without knowledge of the network and device status is inefficient since it leads to additional resources being consumed both in the network and in the device.

Push and pull content capabilities provided by individual application servers in an over-the-top fashion also result inefficiencies since an application server does not know the status of the device to which it is sending information leading to repeated transmissions. Furthermore, the application cannot simply address the device by a name and has to obtain the network IP address of the device before initiating communication. When there is a need to send the same information to a large number of devices, the application has to initiate individual sessions with each of the devices. Additionally, complex mechanisms will be needed for securing the communication such as using public key cryptography.

In light of one or more of these inefficiencies, examples of system and method for communicating data between an application server and at least one machine-to-machine (M2M) device via an internet network and a network is provided.

One example system includes a network element configured to schedule delivery of the data between the application server and at least one M2M device based on network information. The network element may be located on a boundary between the network and the internet network to which the application server communicates with the at least one M2M device.

The network information may include network congestion information indicating an amount of data congestion in the network or status information of the at least one M2M device in the network, or a combination thereof. The status information may include location status information indicating a location of the at least one M2M device, operating status information indicating an operational condition of the at least one M2M device, connection status information indicating a connection condition of the at least one M2M device to the network, battery status information indicating battery power of the at least one M2M device, or a combination thereof.

The system may further include a network monitoring element configured to monitor the network information, where the network element is configured to receive the network information from the network monitoring element for the scheduling of data transfer.

The network element may schedule delivery of the data based on the network information and policy information. The policy information may include at least one of control policy information, network operator policy information, and application provider policy information. The control policy information may include identity information indicative of authorization of the at least one M2M device and application server to transmit or receive the data in the system, the network operator policy information may include a location specific restriction for the at least one M2M device, and the application provider policy information may include notification of registration of the at least M2M device in the network.

The network element may be configured to deliver the data by establishing a first session between the at least one M2M device and the network element according to a first protocol and establishing a second session between the network element and the application server according to a second protocol. In this embodiment, the network element receives the data from the application server and delivers the data to the at least one M2M device via the first and second sessions according to the scheduled delivery time.

In another embodiment, the network element may schedule delivery of the data by transmitting a control signal including scheduling information to the at least one M2M device or the application server, and, based on the control signal, the data is delivered from the application server to the at least one M2M device, or vice versa, without the data being pass through the network element.

Other embodiments also provide a network element for scheduling data to be transmitted between an application server and at least one machine-to-machine (M2M) device via an internet network and a network. The network element may include a session protocol communication unit configured to initiate a first session between the network element and the at least one M2M device according to a first protocol and initiate a second session between the network element and the application server according to a second protocol, a data storage unit configured to temporarily store the data until delivery, and a scheduling unit configured to receive network information concerning the network and schedule delivery of the data between the application server and at least one M2M device via the first and second sessions based on network information.

The network information may include network congestion information indicating an amount of data congestion in the network or status information of the at least one M2M device in the network, or a combination thereof. The status information may include location status information indicating a location of the at least one M2M device, operating status information indicating an operational condition of the at least one M2M device, connection status information indicating a connection condition of the at least one M2M device to the network, battery status information indicating battery power of the at least one M2M device, or a combination thereof.

The scheduling unit may receive the network information from a network monitoring element for the scheduling of data transfer. Also, the scheduling unit may schedule delivery of the data based on the network information and policy information. The policy information may include at least one of control policy information, network operator policy information, and application provider policy information. In one embodiment, the control policy information may include identity information indicative of authorization of the at least one M2M device and application server to transmit or receive the data in the system, the network operator policy information may include a location specific restriction for the at least one M2M device, and the application provider policy information may include notification of registration of the at least one M2M device in the network.

In one embodiment, the session protocol communication unit is configured to deliver the data to the at least one M2M device via the first and second sessions according to the scheduled delivery time.

Other embodiments provide a method for communicating data between an application server and at least one machine-to-machine (M2M) device via an internet network and a network. An example method includes receiving a push notification request from the application server to be delivered to a set of M2M devices, receiving network information from a network monitoring element, and scheduling delivery of the push notification request based on the network information.

The method may also include verifying the application server against policy information to ensure that the application server is authorized to transmit the push notification request, and translating the push notification request from an application server protocol to a wireless network protocol specific to the M2M devices.

The network information may include network congestion information indicating an amount of data congestion in the network, or status information of the at least one M2M device in the network, or a combination thereof. The status information may include location status information indicating a location of at least one M2M device, operating status information indicating an operational condition of the at least one M2M device, connection status information indicating a connection condition of the at least one M2M device to the network, battery status information indicating battery power of the at least one M2M device, or a combination thereof.

In one embodiment, the method may schedule delivery of the push notification based on policy information. The policy information may include at least one of control policy information, network operator policy information, and application provider policy information.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting, and wherein.

DETAILED DESCRIPTION OF EXAMPLE EMBODIMENTS

Various example embodiments will now be described more fully with reference to the accompanying drawings in which some example embodiments are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular fog ins "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the fat in of flowcharts) that may be implemented as program modules or functional processes that include routines, programs, objects, components, data structures, etc., that when executed perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like machines that once programmed become particular machines.

It should be borne in mind, however, that all of these and similar terms are to be associated with the appropriate physical quantities and are merely convenient labels applied to these quantities. Unless specifically stated otherwise, or as is apparent from the discussion, terms such as "acquiring" or "determining" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

One embodiment provides a system and method for communicating data between an application server and at least one machine-to-machine (M2M) device via an internet network and a communication network. For example, the system may include a network element that provides network aware, advanced connectivity services for application servers to connect to their M2M devices. The network element provides transparent communication management for M2M devices and applications, and adapts the service provider's network for the increased growth of connected device traffic.

Figure 1:
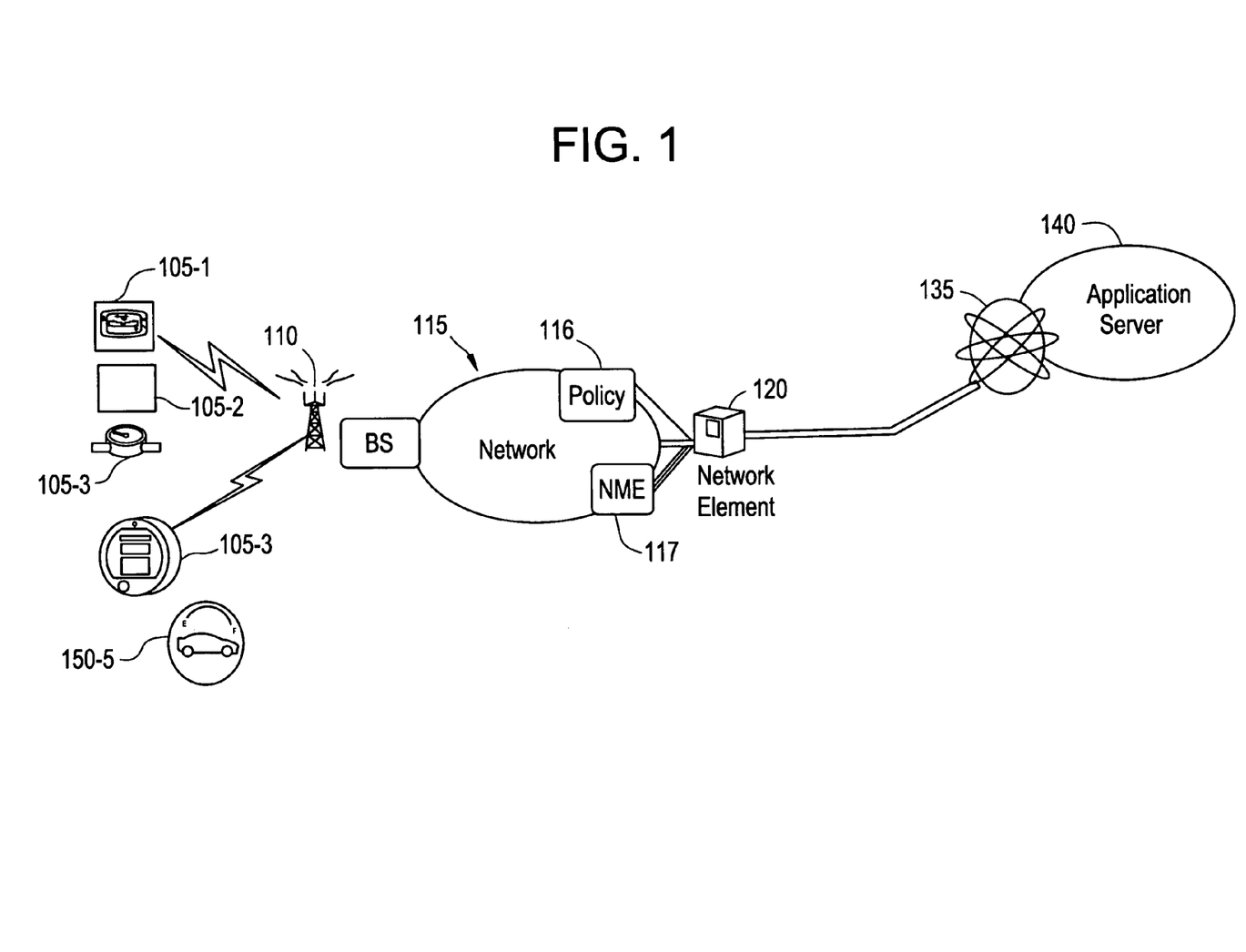
FIG. 1 illustrates a system for communicating data according to an example embodiment.

FIG. 1 illustrates a system for communicating data according to an example embodiment. FIG. 1 illustrates a plurality of M2M devices 105 that are connected to a base station 110 in a network 115. The base station 110 may transmit and/or receive data to and/or from the M2M devices 105 via conventional communication channels between the base station 110 and each of the M2M devices 105. The network 115 may include other components for the transfer of data that are well know such as a Mobile Management Entity (MME), a Home Subscriber Server (HSS), and a wireless packet core including a Packet Data Network Gateway (PGW) and a Serving Network Gateway (SGW), for example. Data is relayed through the network 115 according to any type of standard protocol used to transfer data in a wire/wireless type network such as Hypertext Transfer Protocol (HTTP), Representational State Transfer (REST), Short Message Service (SMS), Unstructured Supplementary Services Data (USSD), Device Language Message specification (DLMS), or any type of proprietary protocols, for example.

The network 115 is connected to an application server 140 via the internet network 135. The application server 140 may be any type of server that includes a processor, memory, and software application. Although only one application server 140 is illustrated in FIG. 1, example embodiments may encompass any number of application servers connected to the network 115. The system may also include other components that are well known for the transfer of data from the network 115 to an internet-based application server 140 (or vice versa) such as an application programming interface (API) and an application exposure framework (AES), for example. The application server 140 transmits requests for information and/or response messages to the network 115 according to any type of standard response-request protocol used to transfer data in an internet-based system such as HTTP or REST exposed through the AES.

The M2M devices 105 may be any type of device that captures an event (such as temperature, inventory level, etc., for example), which is relayed through the network 115 and the internet network 135 to the application server 140. Also, the M2M devices 105 may transmit or receive status notifications, messages containing information, or any other type of data. The M2M devices 105 may include any type of wireless/wired device such as monitoring devices (e.g., sensors), consumer electronics devices, smart phones, personal digital assistants (PDAs), and computers, for example.

One embodiment provides a network element 120 on a boundary between the network 115 and the internet network 135 to which the application server 140 communicates with the M2M devices 105. The network element 120 schedules data transfer between the application server 140 and the M2M devices 105 based on network information and/or policy information. For example, the application server 140 may transmit a request to send or obtain information or messages from specific M2M devices 105 with appropriate policy information (pre-configured or sent together with the information such as when the message has to be delivered, or whether an acknowledgement is required or not, for example. The network element 120 then schedules delivery of such information based on certain network information. Because the network element 120 takes into account network information when scheduling data transfers, the system improves the efficiency of communication networks.

Further, in a gateway mode, the network element 120 may establish communication sessions between the network element 120 and the M2M devices 105 according to the above-identified protocols, establish communication sessions between the network element 120 and the application server 140 according to the above-identified protocols, and transfer the data through the network element 120 at the scheduled delivery time determined by the network element 120.

Also, in a controller mode, the network element 120 may schedule delivery of the data by transmitting a control signal including scheduling information to the M2M devices 105 or the application server 140, and the data is delivered from the application server 140 (or the M2M devices 105) without the data being passed through the network element 120 based on the control signal. These features are further explained below.

The network element 120 may obtain the network information to be used in scheduling data transfer from a network monitoring element (NME) 117. The network element 120 may obtain policy information 116 to be used in scheduling data transfer from the data message itself, a storage unit in the network element 120, a separate element (or separate elements) in the network 115 or the application server 140, or any combination of the above.

The NME 117 may be any type of conventional monitoring element that collects information on the network 115. The NME 117 obtains network congestion information indicating an amount of data congestion in the network 115 and/or status information on each of the M2M devices 105. The status information may include location status information indicating a location of the M2M devices 105, operating status information indicating whether, for example, the M2M devices 105 are awake or asleep, connection status information indicating whether or not the M2M devices 105 are connected to the network 115, battery status information indicating battery power of the M2M devices 105, or any combination of the above. When the network element 120 receives a request to transfer data between the application server 140 and the M2M devices 105, the network element 120 may obtain the above network information from the NME 117 to be used for scheduling delivery of the data, as further explained below.

The policy information 116 includes control policy information, network operator policy information, application provider policy information or any combination of the above. The control policy information may include identity information that indicates which M2M devices 105 and application servers 140 are authorized to transmit or receive the particular data in the system. The network operator policy information may include one or more location specific restrictions for M2M devices 105 such as when to use 2 G/3 G in the case of duel mode modules, a maximum number of simultaneous push/pull per geographical region, and an appropriate mode of communication to the M2M device 105 when multiple options such as SMS or internet protocol are possible, for example. The application provider policy information may include notification when a M2M device 105 is registered in the network 115, notification upon successful push/pull, notification if the M2M device 105 is failing to register at appropriate times or provide tracking updates when the M2M device 105 is expected to register, notification of deviation from expected location, notification about under-active or over-active M2M devices 105, time sensitivity of data push, data aggregation policies, and/or security policies (e.g., what entities can access the M2M device data), for example.

The network element 120 schedules delivery of the data between the M2M devices and the application server 140 taking into account such network information and policy information 116. For example, the network element 120 may ensure a particular M2M device 105 is at a specific location for sending or gathering information, if the policy information 116 dictates such a restriction. Also, the network element 120 may verify against the control policy information indicating which application servers 140 and users are allowed to send or gather information from the M2M devices 105, and ensuring that the requesting application server 140 is allowed to communicate with the M2M device 105.

Further, the network element 120 may obtain network congestion information on the network 115 from the NME 117, and schedule the initiation of sessions to the M2M devices 105 in a manner that meets application requirements while minimizing the impact on the network 115. For example, when there is a need to broadcast to a large number of M2M devices 105 in a large region, the network element 120 may schedule simultaneous sessions to a small number of devices in different sub-regions and sequentially cover the M2M devices 105 within each sub-region.

Also, depending on a level of urgency or priority, the network element 120 may wake up a sleeping M2M device 105 through an alternate technology such as SMS and then establish the communication session if the session cannot be established from the network 115 directly. In another embodiment, the network element may hold the message until the M2M device 105 wakes up and performs a network registration, and then establish the communication session upon such an event. Further, the network element 120 may use battery status information to determine when to establish the communication link to the M2M device 105.

Figure 2:
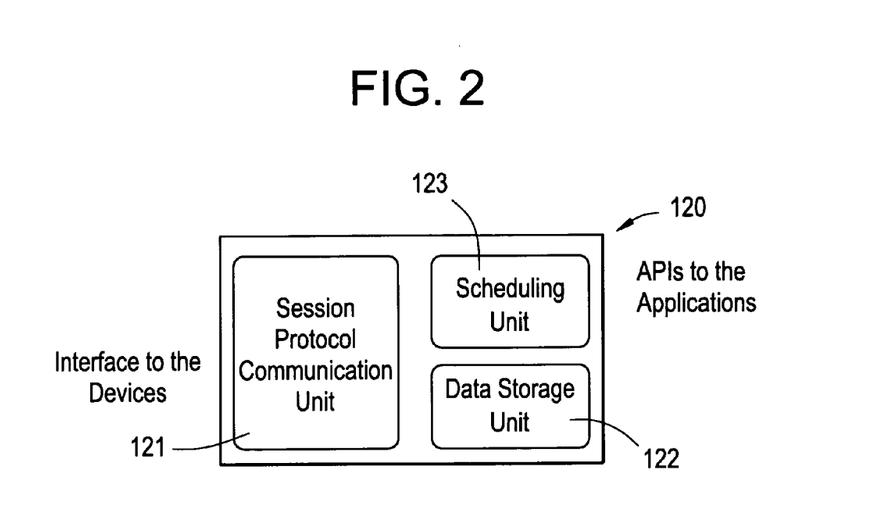
FIG. 2 illustrates a network element according to an example embodiment.

FIG. 2 illustrates a network element 120 according to an example embodiment. The network element 120 includes a session protocol communication unit 121, a scheduling unit 123, and a data storage unit 122. Generally, the network element 120 provides an interface to the M2M devices 105, an interface to the network 115, and an interface to the application server 140, as further explained below.

The scheduling unit 120 may be configured to receive the network information from the NME 117 and to receive the policy information 116, and schedule delivery of the data between the application server 140 and the M2M devices 105 via a communication session established by the session protocol communication unit 121. The data storage unit 122 is configured to temporally store the data until delivery and includes the capabilities of storing a portion (or all) of the policy information 116. As such, the scheduling unit 123 would obtain the policy information 116 from the data storage unit 122 to be used in the scheduling of the data transfer. Otherwise, the scheduling unit 123 obtains the policy information 116 from the data itself or another network element storing such policy information.

The session protocol communication unit 121 is configured to initiate communication sessions to facilitate the data transfer between the M2M devices 105 and the application server 140. For instance, the session protocol communication unit 121 is configured to initiate communication sessions between the network element 120 and each of the M2M devices 105 according one of the above protocols in order to provide an interface between the network element 120 and the M2M devices 105. Also, the session protocol communication unit 121 is configured to initiate communication sessions between the network element 120 and the application server 140 according one of the above protocols in order to provide an interface between the network element 120 and the application server 120. Further, the session protocol communication unit 121 translates the data from an application server protocol to a wireless network protocol specific to the M2M devices 105 (or vice versa).

After the network element 120 schedules delivery of the data based on the network information and/or the policy information 116, the network element 120 may operate in gateway mode or controller mode to facilitate the transfer of data. In the gateway mode, the network element 120 receives a request for information via the communication session established by the session protocol communication unit 121, and the network element 120 directly transfers the request to either the M2M devices 105 or the application server 140 via the other communication session established by the session protocol communication unit 121.

Figure 3:
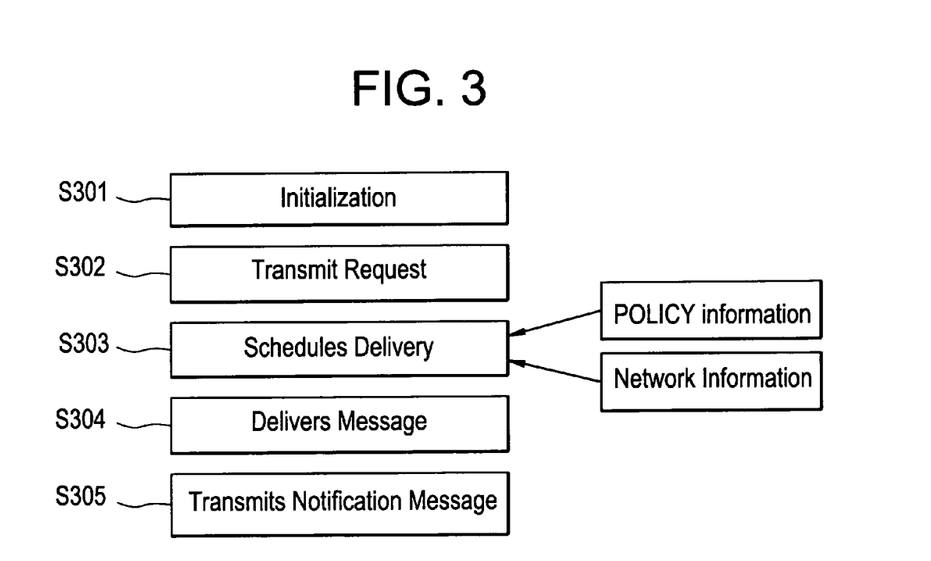
FIG. 3 illustrates an example method for communicating a push notification request from an application server to M2M devices using the network element in a gateway mode.

FIG. 3 illustrates a method for communicating a push notification request from the application server 140 to the M2M devices 105 in the gateway mode according to an example embodiment.

In step S301, the application server 140 initiates the push notification to the network element 120. For example, the application server 140 provisions an M2M device 105 through the API with relevant connectivity information. In step 302, the application server 140 transmits the request to send a push notification to a set of M2M devices 105. In S303, the network element 120 schedules delivery of the push notification. For example, the network element 120 verifies the request against the policy information 116 to ensure that the application server 140 is authorized to transmit the push notification request and receives network information from the NME 117, and schedules delivery of the push notification based on the network information and the policy information 116. Also, the network element 120 translates the push notification from an application server protocol to a wireless network protocol specific to the M2M devices 105.

In step 304, the network element 140 directly delivers the push notification to the M2M devices 105 through the network 115 via the established communication channel. In step 305, the network element 120 sends back a notification upon updating the M2M devices 105 with the relevant information.

Figure 4:
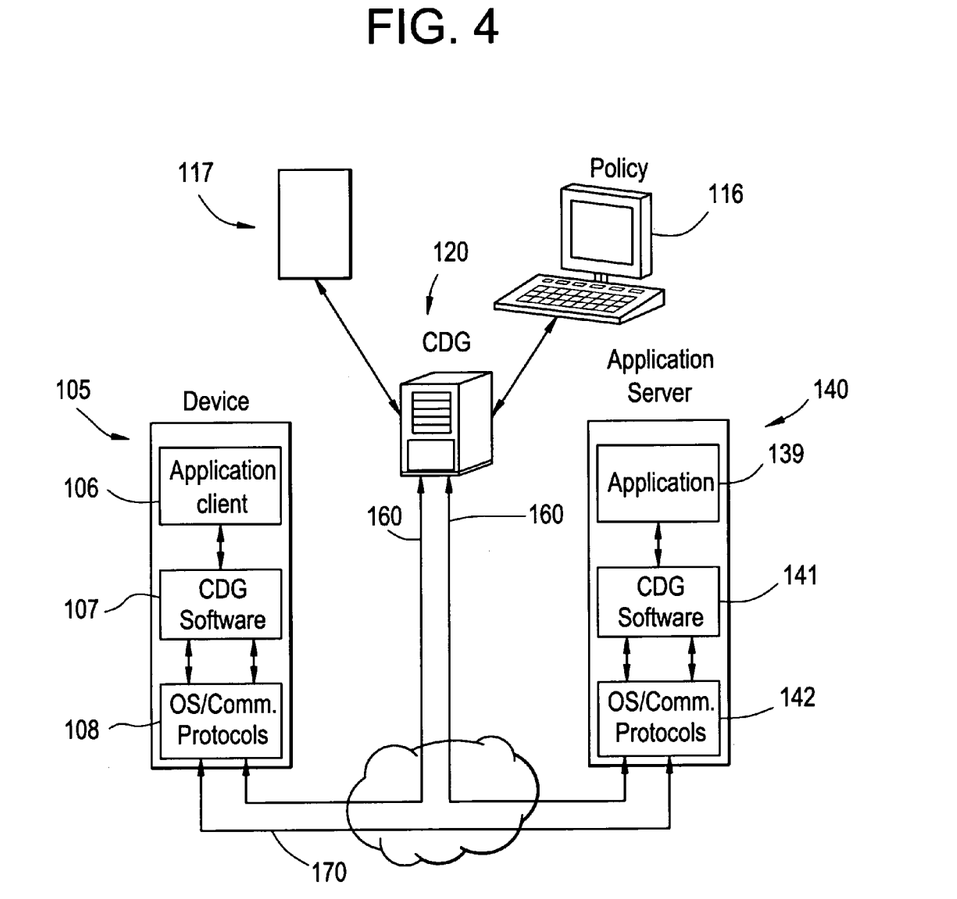
FIG. 4 illustrates the network element in a controller mode according to an example embodiment.

FIG. 4 illustrates a network element 120 in the controller mode according to an example embodiment. The application server 140 includes a network application 139, a network element software layer 141, and a communication protocol unit 142, and each M2M device 105 includes an application client 106, a network element software layer 107, and a communication protocol unit 108. In this embodiment, both the M2M device 105 and the application server 140 include the network element software layer (107, 141) to enable the network element 120 to operate in the controller mode, as further explained below. The network element software layer 107, 141 is installed below the application layer.

The network element 120 schedules the delivery of data between the application server 140 and the M2M device 105 using the network information from the NME 117 and the policy information 116. However, in the controller mode, the network element 120 transmits one or more control signals 160 to at least one of the application server 140 and the M2M device 105 in order to control when the application server 140 may transmit the data directly to the M2M device 105 (or vice versa) via communication session 170 established by the communication protocol unit 108, 142 without the data being passed through the network element 120. The control signal/s includes notification and/or scheduling information on when either the application server 140 or the M2M device 105 should transmit the data.

For messages that are pushed from the M2M devices 105 to the application server 140, the network element 120 may provide notification to the M2M device 105 when the application server 140 has requested the information and/or when the application server is ready to receive the information. By implementing the network element software layer 107 on the operating system of the M2M device 105 and network element software layer 141 on the application server 140, repeated requests to connect to the network 115 by the application server 140 can be filtered and rejected until the control signal/s 160 are received from the network element 120. With this approach, the network 115 is protected without modification to the device application.

Applications will continue to function through the network element software layer 141, 107, which holds or rejects requests from the application layer until the network element 120 provides a notification that the application server 140 is ready for communication with the M2M device 105. For example, suppose the application server 140 is not functional (e.g., system is down). Without the network element 120, the application client 106 on the M2M device 105 will periodically attempt to set up a connection to the application server 140 without success. Each connection attempt by the M2M device 105 results in usage of wireless air-interface resources to set up communication channels over the air interface in order to transmit the data packets between the M2M device 105 and the application server 140. With the network element 120, the network element software layer 107 in the M2M device 105 requests that the network element 120 notify the M2M device 105 when the application server 140 is functional again. Until such a notification is received from the network element 120 via the control signal/s 160, the network element 120 prevents air-interface connection set-up even if the application attempts to establish the connection. The network element software layer 107, 141 operates as a local proxy for the network application in the M2M device 105 and as the device proxy for the application server 140. Also, any network operator policy information regarding communication between the M2M device 105 and the network 115 can be enforced by transmitting policy information from the network element 120 to the network element software layer 107, 141 in the application server 140 and the M2M device 105. In this embodiment, the data traffic itself does not pass through the network element 120.

In a particular example, when the application server 140 queries a Domain Name Server (DNS) to reach the M2M device 105, the address and port number on the network element 120 specific to the M2M device 105 can be provided through DNS redirection. When the application server 140 establishes a session with the M2M device 105 using the address obtained from the DNS, the session is actually established through the network element 120. The network element 120 can then connect to the appropriate M2M device 105 by obtaining the address from the access network that assigned the address. However, in some cases, the network element 120 itself may be assigning the address. In this way, the presence of the network element 120 may be transparent to the application server 140.

Variations of the example embodiments are not to be regarded as a departure from the spirit and scope of the example embodiments, and all such variations as would be apparent to one skilled in the art are intended to be included within the scope of this disclosure.

What is claimed:

1. A system for enabling a communicating of data between an application server and a plurality of machine-to-machine (M2M) devices via an internet network and a network, the system comprising:
a network element having a processor and an associated memory, the processor being configured to schedule delivery of the data between the application server and the plurality of M2M devices based on at least network information and network operator policy information, the network information including at least network congestion information indicating an amount of data congestion in a region covered by the network based on which the network element sequentially delivers data to each subset of the plurality of M2M devices, the network operator policy information indicating at least a threshold number of simultaneous data transfers between the application server and the plurality of M2M devices in a given geographical area.

2. The system of claim 1, wherein the network element is located on a boundary between the network and the internet network via which the application server communicates with the plurality of M2M devices.

3. The system of claim 1, wherein the network information further includes status information of the plurality of M2M devices in the network, the status information including at least one of a group consisting of,
operating status of the plurality of M2M devices;
battery status of the plurality of M2M devices;
location status information indicating a location of the plurality of M2M devices; and
connection status information indicating a connection condition of the plurality of M2M devices to the network.

4. The system of claim 1, further comprising:
a network monitoring element configured to monitor the network information, wherein the network element is configured to receive the network information from the network monitoring element for the scheduling of data transfer.

5. The system of claim 1, wherein the processor is further configured to schedule delivery of the data based on at least one of a group consisting of control policy information and application provider policy information.

6. The system of claim 5, wherein the control policy information includes identity information indicative of authorization of the plurality of M2M devices and application server to transmit or receive the data in the system,
the network operator policy information further indicates a location specific restriction for the plurality of M2M devices and a selected communication technology for communication between the application server and the plurality of M2M devices when multiple communication technologies exist, and
the application provider policy information includes a notification of registration of the plurality of M2M devices in the network.

7. The system of claim 1, wherein the processor is configured to deliver the data by, establishing a first session between the plurality of M2M devices and the network element according to a first protocol, and establishing a second session between the network element and the application server according to a second protocol.

8. The system of claim 7, wherein the processor is configured to receive the data from the application server and deliver the data to the plurality of M2M devices via the first and second sessions according to the scheduled delivery time.

9. The system of claim 1, wherein the processor is configured to schedule delivery of the data by transmitting a control signal including scheduling information to the plurality of M2M devices or the application server, and based on the control signal, the data is delivered from the application server to the plurality of M2M devices, or vice versa, without the data being passed through the network element.

10. A network element for scheduling data to be transmitted between an application server and a plurality of machine-to-machine (M2M) devices via an internet network and a network, the network element including:

a session protocol communication unit configured to initiate a first session between the network element and the plurality of M2M devices according to a first protocol and initiate a second session between the network element and the application server according to a second protocol;

a data storage unit configured to temporarily store the data until delivery; and a scheduling unit configured to receive network information and schedule delivery of the data between the application server and the plurality of M2M devices via the first and second sessions based on at least network information and network operator policy information of the network, the network information including at least network congestion information indicating an amount of data congestion in a region covered by the network based on which the network element sequentially delivers data to each subset of the plurality of M2M devices, the network operator policy information indicating at least a threshold number of simultaneous data transfers between the application server and the plurality of M2M devices in a given geographical area.

11. The network element of claim 10, wherein the network information includes status information of the plurality of M2M devices in the network, the status information including at least one of a group consisting of, operating status of the plurality of M2M devices; battery status of the plurality of M2M devices;

location status information indicating a location of the plurality of M2M devices; and connection status information indicating a connection condition of the plurality of M2M devices to the network.

12. The network element of claim 10, wherein the scheduling unit is configured to receive the network information from a network monitoring element for scheduling the delivery of the data.

13. The network element of claim 10, wherein the data storage unit is configured to store policy information, and the scheduling unit is further configured to schedule delivery of the data based on at least one of a group consisting of control policy information and application provider policy information.

14. The network element of claim 13, wherein the control policy information includes identity information indicative of authorization of the plurality of M2M devices and application server to transmit or receive the data in the system, the network operator policy information further indicates a location specific restriction for the plurality of M2M devices and a selected communication technology for communication between the application server and the plurality of M2M devices when multiple communication technologies exist, and the application provider policy information includes notification of registration of the plurality of M2M devices in the network.

15. The network element of claim 10, wherein the session protocol communication unit is configured to deliver the data to the plurality of M2M devices via the first and second sessions according to the scheduled delivery time.

16. A method for communicating data between an application server and a plurality of machine-to-machine (M2M) devices via an internet network and a network, the method comprising:

receiving a push notification request from the application server to be delivered to a set of the plurality of M2M devices;

receiving at least network information and network operator policy information from a network monitoring element, the network information including at least network congestion information indicating an amount of data congestion in a region covered by the network based on which a network element sequentially delivers data to each subset of the plurality of M2M devices, the network operator policy information indicating at least a threshold number of simultaneous data transfers between the application server and the plurality of M2M devices in a given geographical area;

scheduling delivery of the push notification request based on the network information and the network operator policy information.

17. The method of claim 16, further comprising:

verifying the application server against policy information to ensure that the application server is authorized to transmit the push notification request; and translating the push notification request from an application server protocol to a wireless network protocol specific to M2M devices of the set.

18. The method of claim 16, wherein the network information includes status information of the plurality of M2M devices in the network, the status information including at least one of a group consisting of, operating status of the plurality of M2M devices;

battery status of the plurality of M2M devices;

location status information indicating a location of the plurality of M2M devices; and connection status information indicating a connection condition of the plurality of M2M devices to the network.

19. The method of claim 16, wherein the scheduling further includes scheduling the delivery of the push notification request based on at least one of a group consisting of control policy information and application provider policy information.

20. The method of claim 19, wherein the control policy information includes identity information indicative of authorization of the plurality of M2M devices and application server to transmit or receive the data in the system, the network operator policy information further indicates a location specific restriction for the plurality of M2M devices and a selected communication technology for communication between the application server and the plurality of M2M devices when multiple communication technologies exist, and the application provider policy information includes notification of registration of the plurality of M2M devices in the network.

\* \* \* \* \*